US012674046B2

(12) United States Patent
Ma et al.

(10) Patent No.: US 12,674,046 B2
(45) Date of Patent: Jul. 7, 2026

(54) ADHESIVE FORMULATIONS BASED ON ETHYLENE MULTI-BLOCK INTERPOLYMERS AND FUNCTIONALIZED PROPYLENE-BASED POLYMERS

(71) Applicant: Dow Global Technologies LLC, Midland, MI (US)

(72) Inventors: Wanfu Ma, Shanghai (CN); Allan Walter Mclennaghan, Lachen (CH); Jozef Van Dun, Antwerp (BE); Yanzhen Huang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 575 days.

(21) Appl. No.: 18/007,473

(22) PCT Filed: Jul. 29, 2020

(86) PCT No.: PCT/CN2020/105392
§ 371 (c)(1),
(2) Date: Jan. 30, 2023

(87) PCT Pub. No.: WO2022/021113
PCT Pub. Date: Feb. 3, 2022

(65) Prior Publication Data
US 2023/0272194 A1     Aug. 31, 2023

(51) Int. Cl.
| | |
|---|---|
| *C08L 23/0807* | (2025.01) |
| *C08L 23/04* | (2006.01) |
| *C08L 23/14* | (2006.01) |
| *C08L 51/06* | (2006.01) |
| *C08L 91/06* | (2006.01) |
| *C08L 93/00* | (2006.01) |
| *C09J 7/35* | (2018.01) |
| *C09J 7/38* | (2018.01) |
| *C09J 11/08* | (2006.01) |
| *C09J 123/08* | (2006.01) |
| *C09J 123/14* | (2006.01) |
| *C09J 151/06* | (2006.01) |
| *C09J 153/00* | (2006.01) |

(52) U.S. Cl.
CPC .......... *C08L 23/0807* (2013.01); *C08L 23/14* (2013.01); *C08L 51/06* (2013.01); *C08L 91/06* (2013.01); *C08L 93/00* (2013.01); *C09J 7/35* (2018.01); *C09J 7/38* (2018.01); *C09J 11/08* (2013.01); *C09J 123/0807* (2013.01); *C09J 123/14* (2013.01); *C09J 151/06* (2013.01);

*C09J 153/00* (2013.01); *C08L 2205/035* (2013.01); *C09J 2301/312* (2020.08); *C09J 2423/04* (2013.01); *C09J 2423/10* (2013.01); *C09J 2451/00* (2013.01); *C09J 2453/00* (2013.01); *C09J 2491/00* (2013.01); *C09J 2493/00* (2013.01)

(58) Field of Classification Search
None
See application file for complete search history.

(56) References Cited

U.S. PATENT DOCUMENTS

| | | | | |
|---|---|---|---|---|
| 7,070,051 | B2 * | 7/2006 | Kanner | ............ A61B 17/06133 |
| | | | | 206/460 |
| 8,993,672 | B2 * | 3/2015 | Fredrickson | ............ B29C 48/05 |
| | | | | 524/424 |
| 10,138,398 | B2 | 11/2018 | Hu et al. | |
| 2012/0165455 | A1 | 6/2012 | Vitrano et al. | |
| 2014/0221559 | A1 | 8/2014 | Weeks | |
| 2015/0065638 | A1 | 3/2015 | LiPiShan et al. | |
| 2015/0210902 | A1 | 7/2015 | Botros | |
| 2015/0361315 | A1 | 12/2015 | Karjala et al. | |
| 2016/0304756 | A1 | 10/2016 | Lipi Shan et al. | |
| 2017/0292045 | A1 | 10/2017 | Chen et al. | |
| 2018/0244962 | A1 | 8/2018 | Kanderski et al. | |
| 2019/0284382 | A1 | 9/2019 | Tuberquia et al. | |

FOREIGN PATENT DOCUMENTS

| | | | |
|---|---|---|---|
| JP | 2004307838 A | * | 11/2004 |
| WO | 2006102150 | | 9/2006 |
| WO | 2015102989 | | 7/2015 |
| WO | 2016028909 | | 2/2016 |
| WO | 2020215319 | | 10/2020 |
| WO | 2021222652 | | 11/2021 |

OTHER PUBLICATIONS

Machine translation of JP 2004307838 A (Year: 2004).*
PCT/CN2020/105392, International Search Report and Written Opinion with a mailing date of Apr. 25, 2021.
Office action from corresponding Japanese application: 2023-505838 dated Aug. 6, 2024.

* cited by examiner

*Primary Examiner* — Frank D Ducheneaux

(57) ABSTRACT

A hot melt adhesive (HMA) composition comprises: a) an ethylene/alpha-olefin multi-block interpolymer that has a melt viscosity (177° C.)≤50,000 mPa·s; b) an anhydride and/or carboxylic acid functionalized propylene-based polymer that has a melt viscosity (190° C.)≤50,000 mPa·s; c) a tackifier; and d) a wax. Such composition delivers both a high temperature heat resistance and a fast set time.

20 Claims, No Drawings

ADHESIVE FORMULATIONS BASED ON ETHYLENE MULTI-BLOCK INTERPOLYMERS AND FUNCTIONALIZED PROPYLENE-BASED POLYMERS

CROSS-REFERENCE TO RELATED APPLICATIONS

This application is a national stage entry under 35 U.S.C. § 371 of International Application No. PCT/CN2020/105392, filed on Jul. 29, 2020.

BACKGROUND OF THE INVENTION

A hot melt adhesive (HMA), used for packaging applications, is typically formulated with a low viscosity polymer, a tackifier and a wax, to form a final composition with a given performance property profile. Typical performance properties for a packaging HMA include, the viscosity at the application temperature, some measure of the heat resistance of the bond (for example, PAFT and SAFT), open time and set time, and a measure of the adhesion, usually in terms of a fiber tear across a range of temperatures. Some carton and case sealing applications require packaging hot melt adhesives to have both a high heat resistance and a fast set time, which combination is presently an unmet need in the market. Thus, there is a need for adhesive formulations that deliver both a high temperature heat resistance (for example, a Fiber Tear (at 70° C.)≥90%) and a short set time (for example, ≤2.0 s).

U.S. Publication 2018/0244962 discloses a hot melt adhesive composition comprising the following: (a) about 5% to about 50% by weight of a functionalized polymer comprising a metallocene catalyzed random polyolefin elastomer grafted with maleic anhydride; (b) about 5% to about 70% by weight of a non-functionalized polymer comprising a metallocene catalyzed random or block polyolefin elastomer, as a secondary polymer, with melt index equal to, or greater than, 15; (c) a solid or liquid plasticizer, in an amount up about 30%; (d) about 5% to about 30% by weight of a wax; (e) about 20% to about 70% by weight of a first tackifying resin, having a softening point of at least about 95° C.; (f) about 0% to about 20% by weight of an aromatic reinforcing resin, having a softening point equal to, or greater than, 115° C.; (g) about 0.1% to about 5% by weight of a stabilizer; and (h) about 0% to about 3% by weight of auxiliary additives. See claim 1. An example of component (a) is AFFINITY GA 1000R from the Dow Chemical Company (see paragraph [0029]). The composition may contain an olefin block copolymer (see Tables 1A-1C and Table 2).

U.S. Publication 2016/0304756 discloses a hot melt adhesive composition comprising the following: (a) an ethylene/alpha-olefin multi-block copolymer having a weight average molecular weight (Mw) less than 20,000; (b) a tackifier having a softening temperature from 90° C. to 150° C.; and (c) a wax (see abstract). The composition may optionally comprise one or more other polymer components, such as, for example, a propylene-based polymer and an ethylene-based polymer (functionalized or unfunctionalized). See paragraph [0067]. The wax may be a maleic anhydride modified wax, such as EPOLENE C-18, AC-575A and AC-575P (see paragraph [0054]).

U.S. Publication 2012/0165455 discloses a hot melt adhesive composition comprising the following: (a) about 20 to 70 percent by weight of a polyolefin polymer, having a melt index (I2) of greater than about 5 g/10 minutes; (b) about 2 to 50 percent by weight of an olefin block copolymer (OBC) with a density from about 0.86 g/cc to about 0.89 g/cc; (c) about 10 to 60 percent by weight of a tackifying resin with a softening point from about 95° C. to about 140° C.; and (d) about 0.1 to about 5 percent by weight of an antioxidant. The adhesive composition has a Brookfield viscosity equal to, or less than, about 50,000 cP at 177° C. See claim 1. EPOLENE C-16 and C-18, which are each a polyethylene modified with maleic anhydride, may be used in formulations with the OBC (see paragraph [0032]).

U.S. Publication 2015/0065638 discloses an adhesive composition comprising the following: (a) an olefin block copolymer comprising ethylene and an alpha-olefin comonomer; (b) a tackifier; and (c) an oil. The olefin block copolymer comprises the following: i) hard blocks that comprise 1-8 mol % comonomer; and wherein the hard blocks are present in an amount of 20 wt %-45 wt %, by weight of the olefin block copolymer; ii) soft blocks that comprise 10-14 mol % comonomer; and the olefin block copolymer has a Mw of 15,000 g/mol-100,000 g/mol, a total crystallinity of 5 wt %-30 wt %, a Tm of 60° C.-115° C., and a Tc of 45° C.-100° C. See claim 1. The composition may comprise an additional polyolefin, such as a homogeneously branched ethylene/alpha-olefin copolymer or other olefin block copolymer (see paragraphs [0041]-[0043]).

U.S. Pat. No. 10,138,398 discloses a hot melt adhesive composition comprising the following: (a) about 5 wt % to about 25 wt % of an olefin block copolymer, having an average melt index (I2) greater than 5 and less than about 35 g/10 minutes, at 190° C.; (b) from about 40 wt % to about 70 wt % of a tackifier; (c) from about 0.5 wt % to about 5 wt % of a wax; (d) from about 1 wt % to about 30 wt % of a plasticizer diluent; and (e) from 0 to about 5 wt % of an optional component, such as an antioxidant, a filler, a pigment, a flow modifier, a dyestuff, or a mixture thereof. See claims 1 and 6. The adhesive is disclosed as useful in the construction of nonwoven articles (see abstract).

However, as discussed above, there remains a need for adhesive formulations that deliver both a high temperature heat resistance and a fast set time. This need has been met by the following invention.

SUMMARY OF THE INVENTION

A composition comprising the following components:
a) an ethylene/alpha-olefin multi-block interpolymer that has a melt viscosity (177° C.)≤50,000 mPa·s;
b) an anhydride and/or carboxylic acid functionalized propylene-based polymer that has a melt viscosity (190° C.)≤50,000 mPa·s,
c) a tackifier; and
d) a wax.

DETAILED DESCRIPTION OF THE INVENTION

Compositions have been discovered that delivers both a high temperature heat resistance and a short set time (for example, a Fiber Tear (at 70° C.)≥90% and a set time≤2.0 s). As discussed above, a composition is provided, which comprises the following components:
a) an ethylene/alpha-olefin multi-block interpolymer that has a melt viscosity (177° C.)≤50,000 mPa·s;
b) an anhydride and/or carboxylic acid functionalized propylene-based polymer that has a melt viscosity (190° C.)≤50,000 mPa·s;
c) a tackifier; and d) a wax.

The above composition may comprise a combination of two or more embodiments, as described herein. Each component a)-d) may, independently, comprise a combination of two or more embodiments, as described herein.

In one embodiment, or a combination of two or more embodiments, each described herein, the ethylene/alpha-olefin multi-block interpolymer (component a) has a melt viscosity (177° C.)≤45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s. In one embodiment, or a combination of two or more embodiments, each described herein, component a has a melt viscosity (177° C.)≥1,000 mPa·s, or ≥2,000 mPa·s, or ≥3,000 mPa·s, or ≥4,000 mPa·s, or ≥5,000 mPa·s, or ≥6,000 mPa·s, or ≥8,000 mPa·s, or ≥10,000 mPa·s, or ≥12,000 mPa·s, or ≥14,000 mPa·s.

In one embodiment, or a combination of two or more embodiments, each described herein, the ethylene/alpha-olefin multi-block interpolymer (component a) is an ethylene/alpha-olefin multi-block copolymer.

In one embodiment, or a combination of two or more embodiments, each described herein, the anhydride and/or carboxylic acid functionalized propylene-based polymer (component b) has a melt viscosity (190° C.)≤45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s, or ≤18,000 mPa·s, or ≤16,000 mPa·s. In one embodiment, or a combination of two or more embodiments, each described herein, component b has a melt viscosity (190° C.)≥1,000 mPa·s, or ≥2,000 mPa·s, or ≥3,000 mPa·s, or ≥4,000 mPa·s, or ≥6,000 mPa·s, or ≥8,000 mPa·s, or ≥10,000 mPa·s, or ≥12,000 mPa·s, or ≥14,000 mPa·s.

In one embodiment, or a combination of two or more embodiments, each described herein, the ethylene/alpha-olefin multi-block interpolymer (component a) has a density ≥0.860 g/cc, or ≥0.862 g/cc, or ≥0.864 g/cc, or ≥0.866 g/cc, or ≥0.868 g/cc, or ≥0.870 g/cc, or ≥0.872 g/cc, (1 cc=1 cm³). In one embodiment, or a combination of two or more embodiments, each described herein, component a has a density ≤0.890 g/cc, or ≤0.888 g/cc, or ≤0.886 g/cc, or ≤0.884 g/cc, or ≤0.882 g/cc, or ≤0.880 g/cc, or ≤0.878 g/cc.

In one embodiment, or a combination of two or more embodiments, each described herein, the anhydride and/or carboxylic acid functionalized propylene-based polymer (component b) has a density ≥0.888 g/cc, or ≥0.890 g/cc, or ≥0.892 g/cc, or ≥0.894 g/cc, or ≥0.896 g/cc, or ≥0.898 g/cc, or ≥0.900 g/cc, or ≥0.902 g/cc. In one embodiment, or a combination of two or more embodiments, each described herein, component b has a density ≤0.920 g/cc, or ≤0.918 g/cc, or ≤0.916 g/cc, or ≤0.914 g/cc, or ≤0.912 g/cc, or ≤0.910 g/cc, or ≤0.908 g/cc, or ≤0.906 g/cc.

In one embodiment, or a combination of two or more embodiments, each described herein, the anhydride and/or carboxylic acid functionalized propylene-based polymer (component b) has a melting point (Tm)≥100° C., or ≥105° C., or ≥110° C., or ≥115° C., or ≥120° C., or ≥122° C., or ≥124° C., or ≥126° C., or ≥128° C., or ≥130° C., or ≥131° C. In one embodiment, or a combination of two or more embodiments, each described herein, component b has a melting point (Tm)≤160° C., or ≤155° C., or ≤150° C., or ≤148° C., or ≤146° C., or ≤144° C., or ≤142° C., or ≤140° C., or ≤138° C., or ≤136° C.

In one embodiment, or a combination of two or more embodiments, each described herein, component b is a grafted anhydride and/or carboxylic acid propylene-based polymer.

In one embodiment, or a combination of two or more embodiments, each described herein, component b is an anhydride and/or carboxylic acid functionalized propylene/ethylene copolymer, and further a grafted anhydride and/or carboxylic acid propylene/ethylene copolymer.

In one embodiment, or a combination of two or more embodiments, each described herein, the weight ratio of component a to component b is ≥0.10, or ≥0.15, or ≥0.20, or ≥0.22, or ≥0.24, or ≥0.26, or ≥0.28, or ≥0.30, or ≥0.32. In one embodiment, or a combination of two or more embodiments, each described herein, the weight ratio of component a to component b is ≤5.00, or ≤4.50, or ≤4.00, or ≤3.80, or ≤3.60, or ≤3.40, or ≤3.20, or ≤3.00.

In one embodiment, or a combination of two or more embodiments, each described herein, the weight ratio of component c to component a is ≥1.00, or ≥1.05, or ≥1.10, or ≥1.15, or ≥1.20, or ≥1.25, or ≥1.30. In one embodiment, or a combination of two or more embodiments, each described herein, the weight ratio of component c to component a is ≤5.00, or ≤4.80, or ≤4.60, or ≤4.40, or ≤4.20, or ≤4.00.

In one embodiment, or a combination of two or more embodiments, each described herein, the weight ratio of component c to component b is ≥1.00, or ≥1.05, or ≥1.10, or ≥1.15, or ≥1.20, or ≥1.25, or ≥1.30. In one embodiment, or a combination of two or more embodiments, each described herein, the weight ratio of component c to component b is ≤5.00, or ≤4.80, or ≤4.60, or ≤4.40, or ≤4.20, or ≤4.00.

In one embodiment, or a combination of two or more embodiments, each described herein, the component c is a hydrocarbon resin, further a hydrogenated hydrocarbon resin, and further a hydrogenated cycloaliphatic hydrocarbon resin.

In one embodiment, or a combination of two or more embodiments, each described herein, the wax (component d) has a density ≥0.920 g/cc, or ≥0.925 g/cc, or ≥0.930 g/cc, or ≥0.932 g/cc, or ≥0.934 g/cc, or ≥0.936 g/cc, or ≥0.938 g/cc, or ≥0.939 g/cc, or ≥0.940 g/cc. In one embodiment, or a combination of two or more embodiments, each described herein, component d has a density ≤0.960 g/cc, or ≤0.958 g/cc, or ≤0.956 g/cc, or ≤0.954 g/cc, or ≤0.952 g/cc, or ≤0.950 g/cc.

In one embodiment, or a combination of two or more embodiments, each described herein, the wax (component d) has a melt viscosity (135° C.)≥4.0 mPa·s, or ≥4.5 mPa·s, or ≥5.0 mPa·s, or ≥5.5 mPa·s, or ≥6.0 mPa·s. In one embodiment, or a combination of two or more embodiments, each described herein, component d has a melt viscosity (135° C.)≤30 mPa·s, or ≤25 mPa·s, or ≤20 mPa·s, or ≤18 mPa·s, or ≤16 mPa·s, or ≤14 mPa·s, or ≤12 mPa·s, or ≤10 mPa·s.

In one embodiment, or a combination of two or more embodiments, each described herein, the composition comprises ≥30.0 wt %, ≥32.0 wt %, or ≥34.0 wt %, or ≥36.0 wt %, or ≥38.0 wt % of the sum of components a and b, based on the weight of the composition. In one embodiment, or a combination of two or more embodiments, each described herein, the composition comprises ≤50.0 wt %, or ≤48.0 wt %, ≤46.0 wt %, or ≤44.0 wt %, or ≤42.0 wt % of the sum of components a and b, based on the weight of the composition.

In one embodiment, or a combination of two or more embodiments, each described herein, the composition has a melt viscosity (177° C.)≤8,000 mPa·s, or ≤7,000 mPa·s, or ≤6,000 mPa·s, or ≤5,000 mPa·s, or ≤4,000 mPa·s, or ≤3,000 mPa·s, or ≤2,000 mPa·s. In one embodiment, or a combination of two or more embodiments, each described herein, the composition has a melt viscosity (177° C.)≥200 mPa·s, or ≥300 mPa·s, or ≥400 mPa·s, or ≥500 mPa·s, or ≥600 mPa·s, or ≥700 mPa·s, or ≥800 mPa·s, or ≥900 mPa·s, or ≥1,000 mPa·s, or ≥1,100 mPa·s, or ≥1,200 mPa·s, or ≥1,300 mPa·s.

In one embodiment, or a combination of two or more embodiments, each described herein, the composition has a set time ≤2.0 s, or ≤1.5 s, or ≤1.0 s.

In one embodiment, or a combination of two or more embodiments, each described herein, the composition has Fiber Tear (at 70° C.)≥90%, or ≥91%, or ≥92% or ≥93%, or ≥94%.

Also provided is an article comprising at least one component formed from the composition of any one embodiment, or a combination of two or more embodiments, each described herein.

Ethylene/Alpha-Olefin Multi-Block Interpolymers

Ethylene/alpha-olefin multi-block interpolymers are characterized by multiple blocks or segments of two or more polymerized monomer units, differing in chemical or physical properties. In some embodiments, the multi-block copolymers can be represented by the following formula: $(AB)_n$, where n is at least 1, preferably an integer greater than 1, such as 2, 3, 4, 5, 10, 15, 20, 30, 40, 50, 60, 70, 80, 90, 100, or higher. Here, "A" represents a hard block or segment, and "B" represents a soft block or segment. Preferably the A segments and the B segments are linked in a substantially linear fashion, as opposed to a substantially branched or substantially star-shaped fashion. In other embodiments, the A segments and the B segments are randomly distributed along the polymer chain. In other words, for example, the block copolymers usually do not have a structure as follows: AAA-AA-BBB-BB. In still other embodiments, the block copolymers do not usually have a third type of block or segment, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The term "hard segments (HS)," as used herein, refer to blocks of polymerized monomer units, in which ethylene is present in an amount >90 mol %, or ≥92 mol %, or ≥95 mol %, or ≥98 mol %, or ≥99 mol %, based on the total number of moles of polymerized monomers in the blocks. In one embodiment, ethylene is present in an amount ≤99.8 mol %, or ≤99.6 mol %, or ≤99.4 mol %, or ≤99.3 mol %, based on the total number of moles of polymerized monomers in the blocks.

The term "soft segments (SS)," as used herein, refer to blocks of polymerized monomer units, in which ethylene is present in an amount ≤90 mol %, or ≤88 mol %, or ≤86 mol %, or ≤84 mol %, based on the total number of moles of polymerized monomers in the blocks. In one embodiment, ethylene is present in an amount ≥80 mol %, or ≥81 mol %, or ≥82 mol %, based on the total number of moles of polymerized monomers in the blocks.

Typically, ethylene comprises 50 mole percent or a majority mole percent of the whole multi-block block copolymer; that is, ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an alpha-olefin having three or more carbon atoms.

As discussed, the ethylene/alpha-olefin multi-block interpolymers comprise two or more chemically distinct regions or segments (referred to as "blocks"), preferably joined in a linear manner. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/alpha-olefin multi-block interpolymer is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

The olefin block copolymers, in general, are produced via a chain shuttling process, such as, for example, described in U.S. Pat. No. 7,858,706, which is herein incorporated by reference. Some chain shuttling agents and related information are listed in Col. 16, line 39, through Col. 19, line 44. Some catalysts are described in Col. 19, line 45, through Col. 46, line 19, and some co-catalysts in Col. 46, line 20, through Col. 51 line 28. Some process features are described in Col 51, line 29, through Col. 54, line 56. See also the following: U.S. Pat. Nos. 7,608,668; 7,893,166; and 7,947, 793 as well as US Patent Publication 2010/0197880. See also U.S. Pat. No. 9,243,173.

Tackifiers

Tackifiers are known in the art, and may be solids, semi-solids, or liquids at room temperature. The tackifier includes, but not limited to, aliphatic, cycloaliphatic and aromatic hydrocarbons, modified hydrocarbons, and hydrogenated versions of such hydrocarbons; terpenes, modified terpenes, and hydrogenated versions of such terpenes; and rosins, rosin derivatives, and hydrogenated versions of such rosins; and mixtures of two or more of these tackifiers.

Waxes

The wax includes, but are not limited to, paraffin waxes; microcrystalline waxes; high density, low molecular weight polyethylene waxes or polypropylene waxes; thermally degraded waxes; by-product polyethylene waxes; Fischer-Tropsch waxes; oxidized Fischer-Tropsch waxes; and functionalized waxes, such as hydroxyl stearamide waxes and fatty amide waxes; and mixtures of two or more of these waxes.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers (for example, antioxidants).

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "propylene/alpha-olefin interpolymer," as used herein, refers to a random interpolymer that comprises, in polymerized form, a majority weight percent of propylene (based on the weight of the interpolymer), and an alpha-olefin.

The term "propylene/alpha-olefin copolymer," as used herein, refers to a random copolymer that comprises, in polymerized form, a majority weight percent of propylene (based on the weight of the copolymer), and an alpha-olefin, as the only two monomer types.

The term "propylene/ethylene interpolymer," as used herein, refers to a random interpolymer that comprises, in polymerized form, a majority weight percent of propylene (based on the weight of the interpolymer), and ethylene.

The term "propylene/ethylene copolymer," as used herein, refers to a random copolymer that comprises, in polymerized form, a majority weight percent of propylene (based on the weight of the copolymer), and ethylene, as the only two monomer types.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin multi-block interpolymer," as used herein, refers to a multi-block interpolymer that comprises, in polymerized form, 50 wt % or a majority weight percent of ethylene (based on the weight of the interpolymer), and an alpha-olefin. The term "ethylene/alpha-olefin multi-block copolymer," as used herein, refers to a multi-block copolymer that comprises, in polymerized form, 50 wt % or a majority weight percent of ethylene monomer (based on the weight of the copolymer), and an alpha-olefin, as the only two monomer types. See also prior discussion.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term "ethylene/alpha-olefin copolymer," as used herein, refers to a random copolymer that comprises, in polymerized form, 50 wt % or a majority weight percent of ethylene (based on the weight of the copolymer), and an alpha-olefin, as the only two monomer types.

The term "anhydride and/or carboxylic acid functionalized propylene-based polymer," as used herein, refers to a propylene-based polymer that comprises anhydride groups and/or carboxylic acid groups. Such anhydride groups and/or carboxylic acid groups may be derived from maleic anhydride or other anhydride compounds. The anhydride groups may be converted to carboxylic acid groups by reaction with water.

The phrase "a majority weight percent," as used herein, in reference to a polymer (or interpolymer or copolymer), refers to the amount of monomer present in the greatest amount in the polymer.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A composition comprising the following components:
  a) an ethylene/alpha-olefin multi-block interpolymer that has a melt viscosity (177° C.)≤50,000 mPa·s;
  b) an anhydride and/or carboxylic acid functionalized propylene-based polymer that has a melt viscosity (190° C.)≤50,000 mPa·s;
  c) a tackifier; and
  d) a wax.

B] The composition of A] above, wherein the ethylene/alpha-olefin multi-block interpolymer (component a) has a melt viscosity (177° C.)≤45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s.

C] The composition of A] or B] above, wherein component a has a melt viscosity (177° C.)≥1,000 mPa·s, or ≥2,000 mPa·s, or ≥3,000 mPa·s, or ≥4,000 mPa·s, or ≥5,000 mPa·s, or ≥6,000 mPa·s, or ≥8,000 mPa·s, or ≥10,000 mPa·s, or ≥12,000 mPa·s, or ≥14,000 mPa·s.

D] The composition of any one of A]-C] (A] through C]) above, wherein the ethylene/alpha-olefin multi-block interpolymer (component a) has a density ≥0.860 g/cc, or ≥0.862 g/cc, or ≥0.864 g/cc, or ≥0.866 g/cc, or ≥0.868 g/cc, or ≥0.870 g/cc, or ≥0.872 g/cc (1 cc=1 cm³).

E] The composition of any one of A]-D] above, wherein component a has a density ≤0.890 g/cc, or ≤0.888 g/cc, or ≤0.886 g/cc, or ≤0.884 g/cc, or ≤0.882 g/cc, or ≤0.880 g/cc, or ≤0.878 g/cc.

F] The composition of any one of A]-E] above, wherein the ethylene/alpha-olefin multi-block interpolymer (component a) has a melt index (I2)≥100, or ≥200, or ≥300, or ≥400, or ≥500 dg/min.

G] The composition of any one of A]-F] above, wherein component a has a melt index (I2)≤5,000, or ≤4,000, or ≤3,000, or ≤2,000, or ≤1,000 dg/min.

H] The composition of any one of A]-G] above, wherein the ethylene/alpha-olefin multi-block interpolymer (component a) has an amount of hard segments (HS)≥8 wt %, or ≥10 wt %, or ≥12 wt %, or ≥16 wt %, or ≥18 wt %, or ≥20 wt %, based on the sum weight of the SS (soft segments) and HS.

I] The composition of any one of A]-H] above, wherein component a has an amount of HS≤40 wt %, or ≤35 wt %, or ≤30 wt %, or ≤28 wt %, or ≤26 wt %, or ≤24 wt %, based on the sum weight of the SS and HS.

J] The composition of any one of A]-I] above, wherein the ethylene/alpha-olefin multi-block interpolymer (component a) has an amount of alpha-olefin in the SS≥10 mol %, or ≥12 mol %, or ≥14 mol %, or ≥16 mol %, or ≥18 mol %, based on the total moles of monomers in the SS.

K] The composition of any one of A]-J] above, wherein component a has an amount of alpha-olefin in the soft segment (SS)≤40 mol %, or ≤35 mol %, or ≤30 mol %, or ≤28 mol %, or ≤26 mol %, or ≤24 mol %, or ≤22 mol %, or ≤20 mol %, based on the total moles of monomers in the SS.

L] The composition of any one of A]-K] above, wherein the alpha-olefin of the ethylene/alpha-olefin multi-block interpolymer (component a) is a C3-C20 alpha-olefin, and further a C3-C10 alpha-olefin.

M] The composition of any one of A]-L] above, wherein the alpha-olefin of component a is selected from propylene, 1-butene, 1-pentene, 1-hexene or 1-octene, and further propylene, 1-butene or 1-octene, and further propylene or 1-octene, and further 1-octene.

N] The composition of any one of A]-M] above, wherein the ethylene/alpha-olefin multi-block interpolymer (component a) is an ethylene/alpha-olefin multi-block copolymer.

O] The composition of any one of A]-N] above, wherein the ethylene/alpha-olefin multi-block interpolymer (component a) is selected from the following: an ethylene/propylene multi-block copolymer, an ethylene/butene multi-block copolymer, or an ethylene/octene multi-block copolymer, and further an ethylene/propylene multi-block copolymer, or an ethylene/octene multi-block copolymer, and further an ethylene/octene multi-block copolymer.

P] The composition of any one of A]-O] above, wherein the anhydride and/or carboxylic acid functionalized propylene-based polymer (component b) has a melt viscosity (190° C.)≤45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s, or ≤18,000 mPa·s, or ≤16,000 mPa·s.

Q] The composition of any one of A]-P] above, wherein component b has a melt viscosity (190° C.)≥1,000 mPa·s, or ≥2,000 mPa·s, or ≥3,000 mPa·s, or ≥4,000 mPa·s, or ≥6,000 mPa·s, or ≥8,000 mPa·s, or ≥10,000 mPa·s, or ≥12,000 mPa·s, or ≥14,000 mPa·s.

R] The composition of any one of A]-Q] above, wherein the anhydride and/or carboxylic acid functionalized propylene-based polymer (component b) has a density ≥0.888 g/cc, or ≥0.890 g/cc, or ≥0.892 g/cc, or ≥0.894 g/cc, or ≥0.896 g/cc, or ≥0.898 g/cc, or ≥0.900 g/cc, or ≥0.902 g/cc.

S] The composition of any one of A]-R] above, wherein component b has a density ≤0.920 g/cc, or ≤0.918 g/cc, or ≤0.916 g/cc, or ≤0.914 g/cc, or ≤0.912 g/cc, or ≤0.910 g/cc, or ≤0.908 g/cc, or ≤0.906 g/cc.

T] The composition of any one of A]-S] above, wherein the anhydride and/or carboxylic acid functionalized propylene-based polymer (component b) has a melting point (Tm)≥100° C., or ≥105° C., or ≥110° C., or ≥115° C., or ≥120° C., or ≥122° C., or ≥124° C., or ≥126° C., or ≥128° C., or ≥130° C., or ≥131° C.

U] The composition of any one of A]-T] above, wherein component b has a melting point (Tm)≤160° C., or ≤155° C., or ≤150° C., or ≤148° C., or ≤146° C., or ≤144° C., or ≤142° C., or ≤140° C., or ≤138° C., or ≤136° C.

V] The composition of any one of A]-U] above, wherein the anhydride and/or carboxylic acid functionalized propylene-based polymer (component b) has a weight average molecular weight Mw≥10,000 g/mol, or ≥15,000 g/mol, or ≥20,000 g/mol, or ≥25,000 g/mol, or ≥30,000 g/mol, or ≥32,000 g/mol, or ≥34,000 g/mol, or ≥35,000 g/mol.

W] The composition of any one of A]-V] above, wherein component b has a weight average molecular weight Mw≤60,000 g/mol, or ≤55,000 g/mol, or ≤50,000 g/mol, or ≤48,000 g/mol, or ≤46,000 g/mol, or ≤44,000 g/mol, or ≤42,000 g/mol, or ≤40,000 g/mol.

X] The composition of any one of A]-W] above, wherein the anhydride and/or carboxylic acid functionalized propylene-based polymer (component b) has a number average molecular weight Mn≥6,000 g/mol, or ≥8,000 g/mol, or ≥10,000 g/mol, or ≥12,000 g/mol.

Y] The composition of any one of A]-X] above, wherein component b has a number average molecular weight Mn≤40,000 g/mol, or ≤30,000 g/mol, or ≤28,000 g/mol, or ≤26,000 g/mol, or ≤24,000 g/mol, or ≤22,000 g/mol, or ≤20,000 g/mol, or ≤18,000 g/mol.

Z] The composition of any one of A]-Y] above, wherein the anhydride and/or carboxylic acid functionalized propylene-based polymer (component b) has a molecular weight distribution (Mw/Mn)≥2.00, or ≥2.10, or ≥2.20, or ≥2.30, or ≥2.40 g/mol.

A2] The composition of any one of A]-Z] above, wherein component b has a molecular weight distribution (Mw/Mn)≤3.00, or ≤2.90, or ≤2.80, or ≤2.70, or ≤2.60, or ≤2.50.

B2] The composition of any one of A]-A2] above, wherein the anhydride and/or carboxylic acid functionalized propylene-based polymer (component b) comprises ≥0.5 wt %, or ≥0.6 wt %, or ≥0.7 wt %, or ≥0.8 wt %, or ≥0.9 wt %, or ≥1.0 wt % of anhydride groups and/or carboxylic acid groups, based on the weight of the functionalized propylene-based polymer, and further the anhydride groups and/or carboxylic acid groups are derived from maleic anhydride.

C2] The composition of any one of A]-B2] above, wherein component b comprises ≤4.0 wt %, or ≤3.5 wt %, or ≤3.0 wt %, or ≤2.5 wt %, or ≤2.0 wt %, or ≤1.8 wt %, or ≤1.6 wt %, or ≤1.4 wt % of anhydride groups and/or carboxylic acid groups, based on the weight of the functionalized propylene-based polymer; and further the anhydride groups and/or carboxylic acid groups are derived from maleic anhydride.

D2] The composition of any one of A]-C2] above, wherein component b is an anhydride and/or carboxylic acid functionalized propylene/ethylene interpolymer, and further an anhydride and/or carboxylic acid functionalized propylene/ethylene copolymer.

E2] The composition of any one of A]-C2] above, wherein component b is an anhydride and/or carboxylic acid functionalized propylene/alpha-olefin interpolymer, and further an anhydride and/or carboxylic acid functionalized propylene/alpha-olefin copolymer.

F2] The composition of E2] above, wherein alpha-olefin is a C4-C20 alpha-olefin, and further a C4-C10 alpha-olefin, and further selected from 1-butene, 1-pentene, 1-hexene or 1-octene, and further 1-butene, 1-hexene or 1-octene, and further 1-butene or 1-octene, and further 1-octene.

G2] The composition of any one of A]-F2] above, wherein component b is a grafted anhydride and/or carboxylic acid propylene-based polymer.

H2] The composition of D2] above, wherein component b is a grafted anhydride and/or carboxylic acid propylene/ethylene interpolymer, and further a grafted anhydride and/or carboxylic acid propylene/ethylene copolymer.

I2] The composition of E2] above, wherein component b is a grafted anhydride and/or carboxylic acid propylene/alpha-olefin interpolymer, and further a grafted anhydride and/or carboxylic acid propylene/alpha-olefin copolymer.

J2] The composition of any one of I2] above, wherein alpha-olefin is a C4-C20 alpha-olefin, and further a C4-C10 alpha-olefin, and further selected from 1-butene, 1-pentene, 1-hexene or 1-octene, and further 1-butene, 1-hexene or 1-octene, and further 1-butene or 1-octene, and further 1-octene.

K2] The composition of any one of A]-J2] above, wherein the weight ratio of component a to component b is ≥0.10, or ≥0.15, or ≥0.20, or ≥0.22, or ≥0.24, or ≥0.26, or ≥0.28, or ≥0.30, or ≥0.32.

L2] The composition of any one of A]-K2] above, wherein the weight ratio of component a to component b is ≤5.00, or ≤4.50, or ≤4.00, or ≤3.80, or ≤3.60, or ≤3.40, or ≤3.20, or ≤3.00.

M2] The composition of any one of A]-L2] above, wherein the tackifier (component c) has a melt viscosity (160° C.)≤1,200 mPa·s, or ≤1,100 mPa·s, or ≤1,000 mPa·s, or ≤900 mPa·s, or ≤850 mPa·s.

N2] The composition of any one of A]-M2] above, wherein the tackifier (component c) has a melt viscosity (160° C.)≥500 mPa·s, or ≥550 mPa·s, or ≥600 mPa·s, or ≥650 mPa·s, or ≥700 mPa·s, or ≥750 mPa·s.

O2] The composition of any one of A]-N2] above, wherein the weight ratio of component c to component a is ≥1.00, or ≥1.05, or ≥1.10, or ≥1.15, or ≥1.20, or ≥1.25, or ≥1.30.

P2] The composition of any one of A]-O2] above, wherein the weight ratio of component c to component a is ≤5.00, or ≤4.80, or ≤4.60, or ≤4.40, or ≤4.20, or ≤4.00.

Q2] The composition of any one of A]-P2] above, wherein the weight ratio of component c to component b is ≥1.00, or ≥1.05, or ≥1.10, or ≥1.15, or ≥1.20, or ≥1.25, or ≥1.30.

R2] The composition of any one of A]-Q2] above, wherein the weight ratio of component c to component b is ≤5.00, or ≤4.80, or ≤4.60, or ≤4.40, or ≤4.20, or ≤4.00.

S2] The composition of any one of A]-R2] above, wherein component c is a hydrocarbon resin, further a hydrogenated hydrocarbon resin, and further a hydrogenated cycloaliphatic hydrocarbon resin.

T2] The composition of any one of A]-S2] above, wherein the wax (component d) has a density ≥0.920 g/cc, or ≥0.925 g/cc, or ≥0.930 g/cc, or ≥0.932 g/cc, or ≥0.934 g/cc, or ≥0.936 g/cc, or ≥0.938 g/cc, or ≥0.939 g/cc, or ≥0.940 g/cc.

U2] The composition of any one of A]-T2] above, wherein component d has a density ≤0.960 g/cc, or ≤0.958 g/cc, or ≤0.956 g/cc, or ≤0.954 g/cc, or ≤0.952 g/cc, or ≤0.950 g/cc.

V2] The composition of any one of A]-U2] above, wherein the wax (component d) has a melt viscosity (135° C.)≥4.0 mPa·s, or ≥4.5 mPa·s, or ≥5.0 mPa·s, or ≥5.5 mPa·s, or ≥6.0 mPa·s.

W2] The composition of any one of A]-V2] above, wherein component d has a melt viscosity (135° C.)≤30 mPa·s, or ≤25 mPa·s, or ≤20 mPa·s, or ≤18 mPa·s, or ≤16 mPa·s, or ≤14 mPa·s, or ≤12 mPa·s, or ≤10 mPa·s.

X2] The composition of any one of A]-W2] above, wherein the weight ratio of component d to component a is ≥0.40, or ≥0.45, or ≥0.50, or ≥0.55, or ≥0.60, or ≥0.62, or ≥0.64.

Y2] The composition of any one of A]-X2] above, wherein the weight ratio of component d to component a is ≤4.00, or ≤3.50, or ≤3.00, or ≤2.80, or ≤2.60, or ≤2.40, or ≤2.20.

Z2] The composition of any one of A]-Y2] above, wherein the weight ratio of component d to component b is ≥0.40, or ≥0.45, or ≥0.50, or ≥0.55, or ≥0.60, or ≥0.62, or ≥0.64.

A3] The composition of any one of A]-Z2] above, wherein the weight ratio of component d to component b is ≤4.00, or ≤3.50, or ≤3.00, or ≤2.80, or ≤2.60, or ≤2.40, or ≤2.20.

B3] The composition of any one of A]-A3] above, wherein component d is a Fischer Tropsch wax.

C3] The composition of any one of A]-B3] above, wherein the composition comprises ≥4.0 wt %, or ≥6.0 wt %, or ≥8.0 wt %, or ≥10 wt % of the component a, based on the weight of the composition.

D3] The composition of any one of A]-C3] above, wherein the composition comprises ≤50 wt %, or ≤45 wt %, or ≤40 wt %, or ≤38 wt %, or ≤36 wt %, or ≤34 wt %, or ≤32 wt %, or ≤30 wt % of the component a, based on the weight of the composition.

E3] The composition of any one of A]-D3] above, wherein the composition comprises ≥4.0 wt %, or ≥6.0 wt %, or ≥8.0 wt %, or ≥10 wt % of the component b, based on the weight of the composition.

F3] The composition of any one of A]-E3] above, wherein the composition comprises ≤50 wt %, or ≤45 wt %, or ≤40 wt %, or ≤38 wt %, or ≤36 wt %, or ≤34 wt %, or ≤32 wt %, or ≤30 wt % of the component b, based on the weight of the composition.

G3] The composition of any one of A]-F3] above, wherein the composition comprises ≥25 wt %, or ≥30 wt %, or ≥32 wt %, or ≥34 wt %, or ≥36 wt %, or ≥38 wt % of the component c, based on the weight of the composition.

H3] The composition of any one of A]-G3] above, wherein the composition comprises ≤60 wt %, or ≤55 wt %, or ≤50 wt %, or ≤48 wt %, or ≤46 wt %, or ≤44 wt %, or ≤42 wt %, or ≤40 wt % of the component c, based on the weight of the composition.

I3] The composition of any one of A]-H3] above, wherein the composition comprises ≥5.0 wt %, or ≥10 wt %, or ≥12 wt %, or ≥14 wt %, or ≥16 wt %, or ≥18 wt %, or ≥20 wt % of the component d, based on the weight of the composition.

J3] The composition of any one of A]-I3] above, wherein the composition comprises ≤50 wt %, or ≤45 wt %, or ≤40 wt %, or ≤35 wt %, or ≤30 wt %, or ≤28 wt %, or ≤26 wt %, or ≤24 wt %, or ≤22 wt % of the component d, based on the weight of the composition.

K3] The composition of any one of A]-J3] above, wherein the composition comprises ≥30.0 wt %, ≥32.0 wt %, or ≥34.0 wt %, or ≥36.0 wt %, or ≥38.0 wt % of the sum of components a and b, based on the weight of the composition.

L3] The composition of any one of A]-K3] above, wherein the composition comprises ≤50.0 wt %, or ≤48.0 wt %, ≤46.0 wt %, or ≤44.0 wt %, or ≤42.0 wt % of the sum of components a and b, based on the weight of the composition.

M3] The composition of any one of A]-L3] above, wherein the composition comprises ≥50.0 wt %, ≥60.0 wt %, or ≥70.0 wt %, or ≥80.0 wt %, or ≥90.0 wt %, or ≥92.0 wt %, or ≥94.0 wt %, or ≥96.0 wt %, or ≥98.0 wt %, or ≥99.0 wt % of the sum of components a, b, c and d, based on the weight of the composition.

N3] The composition of any one of A]-M3] above, wherein the composition comprises ≤100.0 wt %, or ≤99.9 wt %, ≤99.8 wt %, or ≤99.7 wt %, or ≤99.6 wt %, or ≤99.5 wt % of the sum of components a, b, c and d, based on the weight of the composition.

O3] The composition of any one of A]-N3] above, wherein the composition has a melt viscosity (177° C.)≤8,000 mPa·s, or ≤7,000 mPa·s, or ≤6,000 mPa·s, or ≤5,000 mPa·s, or ≤4,000 mPa·s, or ≤3,000 mPa·s, or ≤2,000 mPa·s.

P3] The composition of any one of A]-O3] above, wherein composition has a melt viscosity (177° C.)≥200 mPa·s, or ≥300 mPa·s, or ≥400 mPa·s, or ≥500 mPa·s, or ≥600 mPa·s, or ≥700 mPa·s, or ≥800 mPa·s, or ≥900 mPa·s, or ≥1,000 mPa·s, or ≥1,100 mPa·s, or ≥1,200 mPa·s, or ≥1,300 mPa·s.

Q3] The composition of any one of A]-P3] above, wherein the composition has an open time ≤30 s, or ≤28 s, or ≤26 s, or ≤24 s. Open time is described herein.

R3] The composition of any one of A]-Q3] above, wherein the composition has an open time ≥10 s, or ≥12 s, or ≥14 s, or ≥16 s, or ≥18 s.

S3] The composition of any one of A]-R3] above, wherein the composition has a set time ≤2.0 s, or ≤1.5 s, or ≤1.0 s. Set time is described herein.

T3] The composition of any one of A]-S3] above, wherein the composition has Fiber Tear (at 70° C.)≥90%, or ≥91%, or ≥92%, or ≥93%, or ≥94%. Fiber Tear is described herein.

U3] The composition of any one of A]-T3] above, wherein the composition has Fiber Tear (at −20° C.)≥90%, or ≥92%, or ≥94%, or ≥96%, or ≥98%, or ≥99%.

V3] The composition of any one of A]-U3] above, wherein the composition has Fiber Tear, at a temperature from −20° C. to 70° C., ≥90%, or ≥91%, or ≥92%, or ≥93%, or ≥94%.

W3] The composition of any one of A]-V3] above, wherein the composition has a PAFT≥70° C., or ≥71° C., or ≥72° C., or ≥73° C., or ≥74° C., or ≥75° C. PAFT is described herein.

X3] The composition of any one of A]-W3] above, wherein the composition has a SAFT≥100° C., or ≥101° C., or ≥102° C., or ≥103° C., or ≥104° C., or ≥105° C., or ≥106° C. SAFT is described herein.

Y3] The composition of any one of A]-X3] above, wherein the composition further comprises at least one additive, and further at least one antioxidant.

Z3] The composition of any one of A]-Y3] above, wherein the composition further comprises a thermoplastic polymer, different from the ethylene/alpha-olefin multi-block interpolymer (component a), in one or more features, such as monomer(s) types, distributions, and/or amounts, melt viscosity (177° C.), density, melt index (I2), or any combination thereof.

A4] The composition of any one of A]-Z3] above, wherein the composition is an adhesive composition, and further a hot melt adhesive or a pressure sensitive adhesive, and further a hot melt adhesive.

B4] An article comprising at least one component formed from the composition of any one of A]-A4] above.

C4] The article of B4] above, wherein the composition adheres together two surfaces of the article.

D4] The article of B4] or C4] above, wherein the article is a package or a container.

Test Methods

Melt Viscosity

Melt viscosity was measured in accordance with ASTM D 3236, using a Brookfield Viscometer (Model DV0III, version 3), and a SC-31 hot-melt viscometer spindle, at the following temperatures: a) 177° C. for the ethylene/alpha-olefin multi-block interpolymer; b) 177° C. for the composition; and c) 190° C. for the functionalized propylene-based polymer. This method can also be used to measure the melt viscosity of the wax (at 135° C.) and the tackifier (at 160° C.). The sample was poured into an aluminum disposable tube-shaped chamber, which is, in turn, inserted into a Brookfield Thermosel, and locked into place. The sample chamber had a notch on the bottom that fits the bottom of the Brookfield Thermosel, to ensure that the chamber was not allowed to turn, when the spindle was inserted and spinning. The sample (approximately 8-10 grams) was heated to the required temperature, until the melted sample was one inch below the top of the sample chamber. The viscometer apparatus was lowered, and the spindle was submerged into the middle of the sample chamber, wherein the spindle did not touch the sides of the chamber. Lowering was continued, until the brackets on the viscometer aligned on the Thermosel. The viscometer was turned on, and set to operate at a steady shear rate, which led to a torque reading in the range of 40 to 60 percent of the total torque capacity, based on the rpm output of the viscometer. Readings were taken every minute, for 15 minutes, or until the values stabilized, at which point, a final reading was recorded.

Fiber Tear

Fiber Tear (%) of each adhesive composition was determined according to a standardized method, using Inland corrugated cardboard. The composition was heated to 177° C., and then a bead of the composition was applied (at a weight of 2.1 gram per meter) on to a cardboard coupon (25.4 mm×76.2 mm), by drawing the sample composition lengthwise down the cardboard coupon with a spatula or hot melt applicator. A second coupon was quickly placed (within 1 second) on top of the applied composition, with a pressure of 2.5 bar (250 kPa) for 10 seconds, to hold the bond in place. Test samples were conditioned for 24 hours at 23° C. (room temperature), and then conditioned at the respective test temperature (−20° C., 0° C., 23° C. and 70° C.) for at least 24 hours. Immediately after conditioning, samples (n=5) were pulled apart by inserting the blade of a spatula under one corner to fold up the corner of the cardboard. The test sample was then placed on a horizontal surface, with the side having the folded corner facing up. The folded corner was manually pulled as rapidly as possible, at approximately a 45°-90° angle, relative to the coupon's lengthwise axis, to tear the adhesive bond. When applicable, the test sample was held as near as possible to the heating source or the cooling source, each set at the respective test temperature, during this manual pull. The percent of torn fiber remaining on the surface of the adhesive composition (fiber tear) was estimated in 25% increments (that is, 0%, 25%, 50%, 75%, and 100%), and the average value of the five test samples was recorded.

Peel Adhesion Failure Temperature (PAFT) and Shear Adhesion Failure Temperature (SAFT)

Peel Adhesion Failure Temperature (PAFT) was tested according to ASTM D 4498, with a 100 gram weight, using a Cheminstruments OSI-8 programmable oven. Each test sample was initially equilibrated at 40° C. in the oven for 10 minutes, and the oven temperature was increased at an average rate of 0.5° C./minute. The temperature at which the adhesive bond failed was recorded. Each test sample was in a peel mode configuration with the 100 gram weight.

Shear Adhesion Failure Temperature (SAFT) was measured according to ASTM D 4498, with a 500 gram weight, using a Cheminstruments OSI-8 programmable oven. Each test sample was initially equilibrated at 40° C. in the oven for 10 minutes, and the oven temperature was increased at an average rate of 0.5° C./minute. The temperature at which the adhesive bond failed was recorded. Each test sample was in a shear mode configuration with the 500 gram weight.

Each test sample for PAFT or SAFT testing was prepared using two sheets of "60 g/m$^2$" Kraft paper, and each sheet was "6 in.×12 in. (152 mm×305 mm)" in dimensions. On the bottom sheet, lengthwise and separated by a gap of one inch (25 mm), were adhered, in parallel fashion, two "1.75 in. or 2 in. (45 mm or 51 mm)" wide strips of a one sided, pressure-sensitive tape such as a masking tape. The two strips of tape were placed, such that the "one inch gap" ran, lengthwise, down the center of the bottom sheet.

The adhesive composition to be tested was heated to 177° C. (350° F.), and then drizzled in an even manner down the center of the "one inch gap," formed between the two strips of tape. Then, before the composition could unduly thicken, a bonded paper template was quickly formed as follows. A rod rode immediately down the bottom sheet, leveling the adhesive composition within the gap. This rod was shimmed with a strip of the same tape on each side of the gap. After the pass of this first rod, a second sheet of the Kraft paper was aligned to, and laid on top of, the bottom sheet, and a second rod rode immediately down this top sheet, to form a bonded paper template. Overall, the first rod evenly spread the composition in the gap region between the tape strips, and the second rod evenly compressed the second sheet over the top of the gap region and over the top of the tape strips. Within the bonded paper template, a single one inch (25.4 mm) wide strip of the adhesive composition bonded the bottom and top paper sheets. The paper template was cut crosswise into strips of "one inch (25.4 mm)" in width" and "three inches (76.2 mm)" in length, to form test samples. Each test sample had a "one inch×one inch" adhesive bond area in the center. Each test sample was conditioned for 24 hours at room temperature (23° C.) and 54% relative humidity. The test samples were then used in the PAFT and SAFT tests, as noted above. For each test, two test samples from each composition were tested, and the average failure temperature recorded.

Open Time and Set Time

Set Time and Open Time were determined using an INATEC Bond Tester, a mechanical testing device used to form and tear test bonds. The INATEC Bond Tester was heated to 173° C., and this temperature was measured via a hand-held thermocouple. The bottom substrate, "2.5 in. (63.5 mm)×2 in. (50.8 mm)" corrugated board, was moved on a track under an adhesive pot, which delivered a bead of adhesive at a range of "0.26 to 0.29 g/linear m." The adhesive pot pressure was increased, or decreased, as needed, in order to maintain a consistent bead size. A top substrate, "2.5 in. (63.5 mm)×2 in. (50.8 mm)" corrugated board, was applied to the bottom substrate, with a pressure of 2.5 bar (250 kPa). The INATEC had two timers, capable of measuring the set-time and the open-time potential to the nearest second.

Set Time Measurement. The Set Time is the minimum compression time required to achieve a fiber tear of at least 50%. For this test, the open time was set at two seconds (sec). A bond was formed as the top substrate was compressed onto the bottom substrate. After a preset compression time of 5 seconds, a tear test was executed, as the top substrate was pulled from the bottom substrate. A visual assessment was then made to determine the percentage of fiber tear achieved under the preset test conditions. Based on this result, the compression time was increased or decreased in one second intervals, to determine the compression time to achieve 50% or greater fiber tear and the compression time to achieve less than 50% fiber tear. The Set Time was recorded as the shortest compression time at which a minimum of 50% fiber tear was obtained.

Open Time Measurement. Open Time is the longest test time between the adhesive application to one substrate, and the bonding with a second substrate, and which bond results in at least a 50% fiber-tear. For testing, the compression time was set as 15 seconds. For the Open Time measurement, the test time was preset at 10 seconds, and increased in 10 second intervals, until less than 50% fiber tear was achieved. The test time was noted for the % fiber tear starting to drop below 50%, and then the test time was decreased by 5 seconds, and the % fiber tear was determined. The test time required for the % fiber tear to start to drop below 50% was noted. Finally, the test time was decreased by one second intervals, relative to this second noted time, to determine the maximum test time to achieve 50% or greater fiber tear.

Fourier Transform Infrared Spectroscopy (FTIR)—Determination of Maleic Anhydride Content (MAH) in a Functionalized Propylene-based Polymer The concentration of maleic anhydride was determined by the ratio of peak heights of the maleic anhydride at wave number of 1791 cm$^{-1}$ to the polymer reference peak, which, in case of polypropylene, was at wave number of 1156 cm$^{-1}$. Maleic anhydride content was calculated by multiplying this ratio with the appropriate calibration constant. The equation used for maleic grafted olefin-based polymer (with reference peak for polypropylene has the following form, as shown in Equation A1.

$$\text{MAH(wt \%)}=A*\{[\text{FTIR PeakArea at 1791 cm}^{-1}]/[\text{FTIR PeakArea at 1156 cm}^{-1}]+B*[\text{FTIR PeakArea at 1712 cm}^{-1}]/[\text{FTIR\_PeakArea at 1156 cm}^{-1}]\} \qquad \text{(EQ. A1)}$$

The calibration constant A can be determined using 13C NMR standards. The actual calibration constant may differ slightly, depending on the instrument and polymer. The second component at wave number 1712 cm$^{-1}$ accounts for the presence of maleic acid, which was negligible for freshly grafted material. Over time, however, maleic anhydride can readily converted to maleic acid in the presence of moisture. Depending on surface area, significant hydrolysis can occur in just a few days under ambient conditions. The acid has a distinct peak at wave number 1712 cm$^{-1}$. The constant B in Equation A1 was a correction for the difference in extinction coefficients between the anhydride and acid groups.

The sample was prepare by pressing the functionalized polymer to a thickness of about 0.05 to 0.15 millimeters, in a heated press, at 150-180° C., between two protective films, for one hour. MYLAR and TEFLON were suitable protective films to protect the sample from the platens. Aluminum foil must never be used, since maleic anhydride reacts with aluminum. Platens should be under pressure (approx. 10 ton) for about five minutes. The sample was allowed to cool to room temperature, placed in an appropriate sample holder, and then scanned in the FTIR. A background scan should be run before each sample scan, or as needed. The precision of the test was good, with an inherent variability of less than ±5%. Samples should be stored with a desiccant to prevent excessive hydrolysis. Moisture content in the product had been measured as high as 0.1 weight percent. The conversion of anhydride to acid, however, is reversible with temperature, but may take up to one week for complete conversion. The reversion is best performed in a vacuum oven at 150° C.; and a good vacuum (≥27 inches Hg) is required. If the vacuum is less than adequate, the sample tends to oxidize, resulting in an infrared peak at approximately 1740 cm$^{-1}$, which will cause the values for the graft level to be too low. Maleic anhydride and acid were represented by peaks at about 1791 cm$^{-1}$ and 1712 cm$^{-1}$, respectively.

Differential Scanning Calorimetry (DSC)

Differential Scanning calorimetry (DSC) was used to measure Tm, Tc, Tg and crystallinity in propylene-based (PP) samples and ethylene-based (PE) samples. Each sample (0.5 g) was compression molded into a film, at 25000 psi, 190° C., for 10-15 seconds. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 230° C. for PP (180° C. for PE). The sample was kept at this temperature for three minutes. Then the sample was cooled at a rate of 10° C./min to −60° C. for PP (−90° C. for PE), and kept isothermally at that temperature for three minutes. The sample was next heated at a rate of 10° C./min, until complete melting (second heat). Unless otherwise stated, melting point (Tm) and the glass transition temperature (Tg) of each polymer sample were determined from the second heat curve, and the crystallization temperature (Tc) was determined from the first cooling curve. The Tg and the respective peak temperatures for the Tm and the Tc were noted. The percent crystallinity can be calculated by dividing the heat of fusion (Hf), determined from the second heat curve, by a theoretical heat of fusion of 165 J/g for PP (292 J/g for PE), and multiplying this quantity by 100 (for example, % cryst.=(Hf/165 J/g)×100 (for PP)).

Polymer Density

Polymer density was measured in accordance with ASTM D-792.

Gel Permeation Chromatography—Ethylene-Based Polymers

The chromatographic system consists of a PolymerChar GPC-IR (Valencia, Spain) high temperature GPC chromatograph, equipped with an internal infra-red detector (IR5). The autosampler oven compartment is set at 160° C., and the column compartment is set at 150° C. The columns are four AGILENT "Mixed A" 30 cm, 20-micron linear mixed-bed columns. The chromatographic solvent is 1,2,4-trichlorobenzene, which contains 200 ppm of butylated hydroxytoluene (BHT). The solvent source is nitrogen sparged. The injection volume is 200 microliters, and the flow rate is 1.0 milliliters/minute.

Calibration of the GPC column set is performed with 21 narrow molecular weight distribution polystyrene standards, with molecular weights ranging from 580 to 8,400,000 g/mol, and which are arranged in six "cocktail" mixtures, with at least a decade of separation between individual molecular weights. The standards are purchased from Agilent Technologies. The polystyrene standards are prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards are dissolved at 80° C., with gentle agitation, for 30 minutes. The polystyrene standard peak molecular weights are converted to polyethylene molecular weights using Equation 1 (as described in Williams and Ward, J. Polym. Sci., Polym. Let., 6, 621 (1968)):

$$M_{polyethylene}=A\times(M_{polystyrene})^B \qquad \text{(EQ1)},$$

where M is the molecular weight, A has a value of 0.4315 and B is equal to 1.0.

A fifth order polynomial is used to fit the respective polyethylene-equivalent calibration points. A small adjustment to A (from approximately 0.375 to 0.445) is made to correct for column resolution and band-broadening effects, such that linear homopolymer polyethylene standard is obtained at 120,000 Mw.

The total plate count of the GPC column set is performed with decane (prepared at "0.04 g in 50 milliliters" of TCB, and dissolved for 20 minutes with gentle agitation.) The plate count (Equation 2) and symmetry (Equation 3) are measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2, \qquad \text{(EQ2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \qquad \text{(EQ3)}$$

where RV is the retention volume in milliliters, and the peak width is in milliliters, Peak max is the maximum position of the peak, one tenth height is ⅒ height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples are prepared in a semi-automatic manner with the PolymerChar "Instrument Control" Software, wherein the samples are weight-targeted at "2 mg/ml," and the solvent (contains 200 ppm BHT) is added to a pre nitrogen-sparged, septa-capped vial, via the PolymerChar high temperature autosampler. The samples are dissolved for two hours at 160° C. under "low speed" shaking.

The calculations of $Mn_{(GPC)}$, $Mw_{(GPC)}$, and $Mz_{(GPC)}$ are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum_i IR_i}{\sum_i \left(IR_i / M_{polyethylene_i}\right)}, \qquad \text{(EQ 4)}$$

$$Mw_{(GPC)} = \frac{\sum_i \left(IR_i * M_{polyethylene_i}\right)}{\sum_i IR_i}, \text{ and} \qquad \text{(EQ 5)}$$

$$Mz_{(GPC)} = \frac{\sum_i \left(IR_i * M_{polyethylene_i}^2\right)}{\sum_i \left(IR_i * M_{polyehtylene_i}\right)}. \qquad \text{(EQ 6)}$$

In order to monitor the deviations over time, a flowrate marker (decane) is introduced into each sample, via a micropump controlled with the PolymerChar GPC-IR system. This flowrate marker (FM) is used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system, based on a flow marker peak, the effective flowrate (with respect to the narrow standards calibration) is calculated as Equation 7:

Flowrate(effective)=Flowrate(nominal)*(RV(FM Calibrated)/RV(FM Sample)) (EQ7).

Processing of the flow marker peak is done via the PolymerChar GPCOne™ Software. Acceptable flowrate correction is such that the effective flowrate is within +/−0.7% of the nominal flowrate.

Gel Permeation Chromatography (GPC)—Propylene-Based Polymers

A high temperature Gel Permeation Chromatography (GPC) system, equipped with Robotic Assistant Deliver (RAD) system for sample preparation and sample injection, can be used. The concentration detector is an infra-red detector (IR4) from Polymer Char Inc. (Valencia, Spain). Data collection is performed using Polymer Char DM 100 Data acquisition box. The system is equipped with an on-line solvent, degas device from AGILENT. The column compartment is operated at 150° C. The columns are four, "Mixed A" LS 30 cm, 20 micron columns. The solvent is nitrogen (N2) purged, 1,2,4-trichloro-benzene (TCB), containing approximately "200 ppm" of 2,6-di-t-butyl-4-methylphenol (BHT). The flow rate is 1.0 mL/min, and the injection volume is 200 µl. A "2 mg/mL" sample concentration is prepared by dissolving the sample in N2 purged and preheated TCB (containing 200 ppm BHT), for 2.5 hours at 160° C., with gentle agitation.

The GPC column set is calibrated by running 20 narrow molecular weight distribution polystyrene (PS) standards. The molecular weight (MW) of the standards range from 580 to 8,400,000 g/mol, and the standards are contained in six "cocktail" mixtures. Each standard mixture has at least a decade of separation between individual molecular weights. The equivalent polypropylene molecular weight of each PS standard is calculated using the following equation (1), with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}},$$

where $M_{PP}$ is PP equivalent MW, $M_{PS}$ is PS equivalent MW. The log K and a values of Mark-Houwink coefficients for PP and PS are listed below in Table A.

TABLE A

| Polymer | a | logK |
| --- | --- | --- |
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum_i Wf_i}{\sum_i \left(Wf_i / M_i\right)}, \qquad \text{(2)}$$

$$M_w = \frac{\sum_i \left(Wf_i * M_i\right)}{\sum_i \left(Wf_i\right)}, \qquad \text{(3)}$$

where $w_{fi}$ and $M_i$, are the weight fraction and molecular weight of elution component i, respectively (note, MWD=Mw/Mn).

13C NMR for Determination of the Amount of Hard Segments (HS) and the Amount of Alpha-Olefin in Soft Segments (SS), in an Ethylene/Alpha-Olefin Multi-Block Interpolymer 13C NMR spectroscopy is one of a number of techniques known in the art for measuring comonomer incorporation into a polymer. An example of this technique is described for the determination of comonomer content for ethylene/alphaolefin copolymers in Randall (Journal of Macromolecular Science, Reviews in Macromolecular Chemistry and Physics, C29 (2 & 3), 201-317 (1989)), which is incorporated by reference, herein, in its entirety. The basic procedure for determining the comonomer content of an ethylene/alphaolefin interpolymer involves obtaining a 13C NMR spectrum, under conditions where the intensity of the peaks, corresponding to the different carbons in a sample, is directly proportional to the total number of contributing nuclei in the sample. Methods for ensuring this proportionality are known in the art, and involve the allowance for sufficient time for relaxation after a pulse, the use of gated-decoupling techniques, relaxation agents, and the like. The relative intensity of a peak or group of peaks is obtained, in practice, from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the afore-mentioned Randall reference.

Since the hard segment (or hard segments) in an ethylene/alpha-olefin multi-block interpolymer generally has less than about 2.0 wt % comonomer, its major contribution to the spectrum is only for the integral at about 30 ppm. The hard segment contribution to the peaks "not at 30 ppm" is assumed negligible at the start of the analysis. So, for the starting point, the integrals of the peaks "not at 30 ppm" are assumed to come from the soft segment (or soft segments) only. These integrals are fit to a first order Markovian statistical model for copolymers, using a linear least squares minimization, thus generating fitting parameters (i.e., probability of octene insertion after octene, $P_{oo}$, and probability of octene insertion after ethylene, $P_{eo}$) that are used to compute the soft segment contribution to the 30 ppm peak. The difference between the "total measured 30 ppm peak integral" and the "computed soft segment integral contribution to the 30 ppm peak" is the contribution from the hard segment. Therefore, the experimental spectrum has now been deconvoluted into two integral lists describing the soft segment and hard segment, respectively. The calculation of weight percentage of the hard segment is straight forward, and calculated by the ratio of the sum of integrals for the hard segment spectrum to the sum of integrals for the overall spectrum.

From the deconvoluted soft segment integral list, the comonomer composition can be calculated according to the method of Randall, for example. From the comonomer composition of the overall spectrum and the comonomer composition of the soft segment, one can use mass balance to compute the comonomer composition of the hard segment. From the comonomer composition of the hard segment, Bernoullian statistics is used to calculate the contribution of the hard segment to the integrals of "non 30 ppm peaks." There is usually so little octene, typically from about 0 to about 1 mol %, in the hard segment, that Bernoullian statistics is a valid and robust approximation. These contributions are then subtracted out from the experimental integrals of the "non 30 ppm peaks." The resulting "non 30 ppm peak" integrals are then fitted to a first order Markovian statistics model for copolymers as described in the above paragraph. The iterative process is performed in the following manner: fit total "non 30 ppm peaks" then compute soft segment contribution to 30 ppm peak; then compute soft/ hard segment split and then compute hard segment contribution to "non 30 ppm peaks;" then correct for hard segment contribution to "non 30 ppm peaks" and fit resulting "non 30 ppm peaks." This is repeated until the values for soft/hard segment split converge to a minimum error function. The final comonomer compositions for each segment are reported.

Validation of the measurement is accomplished through the analysis of several in situ polymer blends. By design of the polymerization and catalyst concentrations, the expected split is compared to the measured NMR split values. Table B shows the chemical shift assignments for ethylene octene polymers.

TABLE B

| Chemical Shift Assignments for Ethylene/Octene Copolymers | |
| --- | --- |
| 41-40.6 ppm | OOOE/EOOO αα CH2 |
| 40.5-40.0 ppm | EOOE αα CH2 |
| 38.9-37.9 ppm | EOE CH |
| 36.2-35.7 ppm | OOE center CH |
| 35.6-34.7 ppm | OEO αγ, OOO center 6B, OOEE αδ+, OOE center 6B CH2 |
| 34.7-34.1 ppm | EOE αδ+, EOE 6B CH2 |
| 33.9-33.5 ppm | OOO center CH |
| 32.5-32.1 ppm | 3B CH2 |
| 31.5-30.8 ppm | OEEO γγ CH2 |
| 30.8-30.3 ppm | OE γδ+ CH2 |
| 30.3-29.0 ppm | 4B, EEE δ+δ+ CH2 |
| 28.0-26.5 ppm | OE βδ+ 5B |
| 25.1-23.9 ppm | OEO ββ |
| 23.0-22.6 ppm | 2B |
| 14.5-14.0 ppm | 1B |

The following experimental procedure can be used. Each sample is prepared by adding approximately 2.6 grams of a 50/50 mixture of tetrachloroethane-d2/orthodichloro-ben-zene, which is 0.025M in chromium acetylacetonate (relax-ation agent), to a 0.2 gram sample of polymer, in a 10 mm NMR tube. The sample is dissolved and homogenized by heating the tube and its contents to 150° C. The data are collected using a Bruker 400 MHz spectrometer, equipped with a Bruker Dual DUL high-temperature CryoProbe. The data are acquired using 160 scans per data file, a 6 second pulse repetition delay, and with a sample temperature of 120° C. The acquisitions are carried out using spectral width of 25,000 Hz and a file size of 32K data points.
Melt Index The melt index (I2) of an ethylene-based polymer is measured in accordance with ASTM D-1238, condition 190° C./2.16 kg. The melt flow rate (MFR) of a propylene-based polymer is measured in accordance with ASTM D-1238, condition 230° C./2.16 kg.

EXPERIMENTAL

Commercial Polymers and Additives

Polymers, tackifier and other components are listed in Table 1. Adhesive compositions are listed in Table 2.

TABLE 1

| Composition Components | | |
| --- | --- | --- |
| Component | Specification | Source |
| Ethylene/alpha-olefin multi-block copolymer | Ethylene/octene multi-block copolymer Hard segments (HS) content: 22 wt % 18 mol % octene in soft segments (SS) | The Dow Chemical Co. |

TABLE 1-continued

| Composition Components | | |
| --- | --- | --- |
| Component | Specification | Source |
| | Melt viscosity at 177° C. (Brookfield) = 17,800 mPa · s Density = 0.875 g/cc | |
| AFFINITY GA 1950 | Ethylene/octene copolymer Density = 0.874 g/cc Melt viscosity at 177° C. (Brookfield) = 17000 mPa · s | The Dow Chemical Co. |
| AFFINITY GA 1000R | Maleic anhydride grafted ethylene/octene copolymer Melt viscosity at 177° C. (Brookfield) = 13000 mPa · s Density = 0.878 g/cc MAH Graft Level: 1.1 wt %, based on weight of the grafted polymer | The Dow Chemical Co. |
| DuPont FUSABOND P353 | Maleic anhydride grafted propylene based polymer Density = 0.904 g/cc MAH Graft Level = 1.3 wt % Melt viscosity at 190° C. (Brookfield) = 15000 mPa · s Tm = 132° C.-135° C. Vicat softening point = 112° C.; Mw = 36,160 g/mol, Mn = 14,940 g/mol, Mz = 62,460 g/mol, Mw/Mn = 2.42 | The Dow Chemical Co. |
| ESCOREZ 5400 | Tackifier: hydrogenated cycloaliphatic hydrocarbon resin Ring and ball softening point = 103.4° C. Melt viscosity at 160° C. (Brookfield) = 800 mPa · s Color (YI) = 0.6 | Exxon |
| SASOLWAX H1 | Fischer Tropsch wax density = 0.94 g/cc acid number = <0.1 mg KOH/g congealing point = 96-100° C. drop melting point = 112° C. melt viscosity at 135° C. (Brookfield) = 6-10 mPa · s | Sasol |
| IRGANOX 1010 (AO) | Antioxidant: pentaerythritol tetrakis(3-(3,5-di-tert-butyl-4-hydroxyphenyl)propionate) (CAS 6683-19-8) density = 1.15 g/cc | BASF |

Syntheses of the Ethylene/Alpha-Olefin Multi-Block Copolymer

Continuous solution polymerizations were carried out in a batch reactor (for example, a CSTR), equipped with an internal stirrer. Purified mixed alkanes solvent (ISOPAR E available from ExxonMobil), monomers, and molecular weight regulator (hydrogen or chain shuttling agent) were supplied to a "3.8 L" reactor, equipped with a jacket for temperature control. The solvent feed to the reactor was measured by a mass-flow controller. A pump controlled the solvent flow rate and the pressure to the reactor. At the discharge of the pump, a side stream was taken to provide flush flows for the procatalyst, co-catalyst, and chain shuttling agent (catalyst component solutions) injection lines. These flows were measured and controlled, to maintain an efficient production rate. The remaining solvent was combined with monomers and hydrogen, and fed to the reactor. The temperature of the solvent/monomer solution was controlled by use of a heat exchanger. This solution stream entered the bottom of the reactor.

The catalyst component solutions were metered using pumps and flow meters, combined with the catalyst flush solvent, and introduced into the bottom of the reactor. The reactor was liquid full at "500 psig" with vigorous stirring. Polymer was removed through exit lines at the top of the reactor. The reactor effluent was deactivated with the addition of, and reaction with, a suitable reagent (water), and other additives were added for polymer stabilization. Following the catalyst deactivation and the additive addition, the polymer was removed from the non-polymer stream by devolatilization. The isolated polymer melt was pelletized and collected. Process details are contained in Table 2.

TABLE 2

| Process Parameters | | | | | | | |
| --- | --- | --- | --- | --- | --- | --- | --- |
| $C_2H_4$ (kg/ hr) | $C_8H_{16}$ (kg/hr) | Solv. (kg/hr) | $H_2$ SCCM[1] | T (° C.) | Cat A1[2] ppm | Cat A1 Flow (kg/hr) | Cat B2[3] ppm | Cat B2 Flow (kg/ hr) |
| 1.43 | 2.24 | 9.8 | 72.1 | 125 | 94.5 | 0.11 | 14.3 | 0.12 |

| DEZ[4] Flow (kg/ hr) | Zn in poly-mer ppm | Cocat[5] Conc ppm | Cocat Flow (kg/hr) | Poly Rate[6] (kg/ hr) | Conv. (%)[7] | Solid (%) | Eff.[8] |
| --- | --- | --- | --- | --- | --- | --- | --- |
| 0.14 | 440 | 922 | 0.12 | 2.33 | 92.7 | 20.7 | 0.2 |

[1]Standard cm³/min.
[2][N-(2,6-Di(1-methylethyl)phenyl)amido](2-isopropylphenyl)(α-naphthalen-2-diyl(6-pyridin-2-diyl)methane)]hafnium dimethyl.
[3]Bis-(1-(2-methylcyclohexyl)ethyl)2-oxoyl-3,5-di(t-butyl)phenyl)immino) zirconium dimethyl.
[4]Diethyl zinc.
[5]A mixture of methyldi($C_{14-18}$ alkyl) ammonium salts of tetrakis(pentafluorophenyl)borate.
[6]Polymer production rate.
[7]Percent ethylene conversion in reactor.
[8]Efficiency, kg polymer/g M where g M = g Hf + g Zr.

Preparation of Adhesive Composition

For each composition, the corresponding components, as shown in Table 3, were weighed into an iron container, preheated in an oven, at a temperature of 177° C., for 30 minutes. The mixture was then melt blended in a heated block, at a temperature of 177° C., for 10 minutes, with a "Paravisc style" mixing head, running at 100 rotations per minute (rpm). The composition viscosity and the adhesive properties are shown in Table 3.

TABLE 3

| | Compositions* | | | | | |
| | Ex. 1 | Ex. 2 | Ex. 3 | CS. 1 | CS. 2 | CS. 3 |
|---|---|---|---|---|---|---|
| Ethylene/alpha-olefin multi-block copolymer | 30 | 20 | 10 | 40 | 30 | — |
| FUSABOND P353 | 10 | 20 | 30 | — | — | 10 |
| AFFINITY GA 1950 | — | — | — | — | — | 30 |
| AFFINITY GA 1000R | — | — | — | — | 10 | — |
| ESCOREZ 5400 (tackifier) | 39.5 | 39.5 | 39.5 | 39.5 | 39.5 | 39.5 |
| SASOL H1 (wax) | 20 | 20 | 20 | 20 | 20 | 20 |
| AO | 0.5 | 0.5 | 0.5 | 0.5 | 0.5 | 0.5 |
| Total | 100% | 100% | 100% | 100% | 100% | 100% |
| Viscosity† @ 177° C. mPa · s | 1345 | 1550 | 1770 | 1352 | 1111 | 1535 |
| PAFT (° C.) | 75.3 | 78.5 | 78.6 | 62.5 | 66.3 | 74 |
| SAFT (° C.) | 106 | 110.5 | >120 | 97.3 | 93.5 | 92.9 |
| Open Time (s) | 23 | 23 | 21 | 18 | 20 | 22 |
| Set Time (s) | 1 | 1 | 1 | 1 | 1 | 2 |
| Fiber Tear (%)‡ −20° C. | 100 | 100 | 100 | 100 | 100 | 100 |
| 0° C. | 100 | 100 | 100 | 100 | 100 | 100 |
| 23° C. | 100 | 100 | 100 | 100 | 100 | 100 |
| 70° C. | 94 | 100 | 100 | 36 | 58 | 66 |

CS = Comparative Sample
*Table values are weight percent (wt%), based on the total weight of the composition
†Viscosity of the composition
‡Fiber tear percentage on corrugated carton As seen in Table 3, compared to the comparative compositions (CS. 1, CS. 2 and CS. 3), the inventive compositions (Ex. 1, Ex. 2 and Ex. 3) exhibited the following properties: (i) higher fiber tear percentage at 70° C.; (ii) higher PAFT (>70° C.), and (iii) higher SAFT (>100° C.). The inventive compositions also had low viscosities (177° C.), and excellent Fiber Tear at −20° C., 0° C. and 23° C., with results at 100% for each test temperature. The inventive compositions also exhibited shorter set times (≤1 s) than the comparative composition CS. 3.

The invention claimed is:

1. A composition comprising the following components:
a) an ethylene/alpha-olefin multi-block interpolymer that has a melt viscosity (177° C.)≤50,000 mPa·s;
b) an anhydride and/or carboxylic acid functionalized propylene-based polymer that has a melt viscosity (190° C.)≤50,000 mPa·s and wherein the anhydride and/or carboxylic acid functional propylene-based polymer (component b) has a melt viscosity (190° C.)≥12,000 mPa·s;
c) a tackifier; and
d) a wax;
wherein the composition comprises from 30.0 wt % to 50.0 wt % of the sum of component a and component b, based on the weight of the composition; and
wherein the composition has Fiber Tear (at 70° C.)≥90%.

2. The composition of claim 1, wherein the ethylene/alpha-olefin multi-block interpolymer (component a) is an ethylene/alpha-olefin multi-block copolymer.

3. The composition of claim 1, wherein the ethylene/alpha-olefin multi-block interpolymer (component a) has a density from 0.860 g/cc to 0.890 g/cc.

4. The composition of claim 1, wherein the anhydride and/or carboxylic acid functionalized propylene-based polymer (component b) has a density from 0.888 g/cc to 0.920 g/cc.

5. The composition of claim 1, wherein the anhydride and/or carboxylic acid functionalized propylene-based polymer (component b) has a melting point (Tm) from 100° C. to 160° C.

6. The composition of claim 1, wherein component b is a grafted anhydride and/or carboxylic acid propylene-based polymer.

7. The composition of claim 1, wherein component b is an anhydride and/or carboxylic acid functionalized propylene/ethylene copolymer.

8. The composition of claim 1, wherein the weight ratio of component a to component b is from 0.10 to 5.00.

9. The composition of claim 1, wherein the weight ratio of component c to component a is from 1.00 to 5.00.

10. The composition of claim 1, wherein the weight ratio of component c to component b is from 1.00 to 5.00.

11. The composition of claim 1, wherein component c is a hydrocarbon resin.

12. The composition of claim 1, wherein the wax (component d) has a density from 0.920 g/cc to 0.960 g/cc.

13. The composition of claim 1, wherein the wax (component d) has a melt viscosity (135° C.) from 4.0 mPas to 30 mPa·s.

14. The composition of claim 1, wherein the composition has a melt viscosity (177° C.) from 200 mPa·s to 8,000 mPa·s.

15. The composition of claim 1, wherein the composition has set time ≤2.0 s.

16. The composition of claim 1, wherein the composition has Fiber Tear (at −20° C.)≥90%.

17. The composition of claim 1, wherein the composition has Fiber Tear, at a temperature from −20° C. to 70° C., ≥90%.

18. The composition of claim 1, wherein the anhydride and/or carboxylic acid functionalized propylene-based polymer has a melt viscosity (190° C.) from 14,000 to 30,000 mPa·s.

19. The composition of claim 1, wherein the composition has a PAFT ≥70° C.

20. An article comprising at least one component formed from the composition of claim 1.

* * * * *